(12) United States Patent
Ewing

(10) Patent No.: US 6,284,177 B1
(45) Date of Patent: Sep. 4, 2001

(54) RECYCLABLE PRINTABLE MEDIA

(76) Inventor: William D. Ewing, P.O. Box 223, Tiberton, RI (US) 02878

( * ) Notice: Subject to any disclaimer, the term of this patent is extended or adjusted under 35 U.S.C. 154(b) by 0 days.

(21) Appl. No.: 09/291,972

(22) Filed: Apr. 15, 1999

Related U.S. Application Data

(63) Continuation-in-part of application No. PCT/US97/01798, filed on Oct. 15, 1997, which is a continuation of application No. 08/729,332, filed on Oct. 15, 1996, now abandoned.

(51) Int. Cl.[7] .................................................. B29C 49/00
(52) U.S. Cl. ........................ 264/140; 264/141; 428/299.7
(58) Field of Search ..................................... 264/140–144; 428/299.7

(56) References Cited

U.S. PATENT DOCUMENTS

| | | |
|---|---|---|
| 3,958,064 | 5/1976 | Brekken et al. . |
| 4,325,850 | 4/1982 | Mueller . |
| 4,652,409 | 3/1987 | Leese et al. . |
| 4,941,947 | 7/1990 | Guckert et al. . |
| 5,047,121 | 9/1991 | Kochar . |
| 5,072,671 | 12/1991 | Schneider et al. . |
| 5,079,097 | 1/1992 | Sasaki et al. . |
| 5,089,316 | 2/1992 | Sasaki et al. . |
| 5,229,218 | 7/1993 | Dobreski . |
| 5,242,546 | 9/1993 | Evans et al. . |
| 5,268,074 | 12/1993 | Brooks et al. . |
| 5,328,749 | 7/1994 | Noda et al. . |
| 5,346,763 | 9/1994 | Balloni et al. . |
| 5,366,854 | 11/1994 | Miyoshi et al. . |
| 5,474,968 | 12/1995 | Norimatsu . |
| 5,494,745 * | 2/1996 | Vander Velden et al. ........... 428/354 |

* cited by examiner

*Primary Examiner*—Scott W. Houtteman
(74) *Attorney, Agent, or Firm*—Larson & Taylor, PLC

(57) ABSTRACT

A printable tape of a thermoplastic material for use in cash registers to improve the efficiency of the check out process and enhance the post consumer recyclability of the plastic bags used by the stores. The tape comprises a thermoplastic material, typically polyethylene or polypropylene, a pigment to provide sufficient opacity such that printing on the printable media is readable and a sufficient amount of a matting agent to improve the printability of the printable media.

22 Claims, No Drawings

RECYCLABLE PRINTABLE MEDIA

This is a continuation-in-part application of PCT/US97/017989 filed on Oct. 15, 1997, designating the United States of America, which is a continuation application of U.S. Ser. No. 08/729,332, filed on Oct. 15, 1996, now abandoned.

FIELD OF THE INVENTION

The present invention relates to a recyclable printable media for sales receipts, particularly to a printable polyethylene media which is compatible with shopping bags in the post-consumer recycling processes.

BACKGROUND OF THE INVENTION

The present system of printing sales receipts employs a printable paper media which is printed by a cash register or other business machine using an inkjet, thermal or ribbon printer. The printed receipt is handed to the customer and/or in many cases is placed in the shopping bag with the purchased products. An average cash register tape is 3" in width and 190' in length and the roll is approximately 3" in diameter. Many retail stores place the customer's purchase in a plastic bag and more and more stores are becoming involved with the effort to collect and recycle those bags. A major problem in the recycling of the plastic bag material is the paper receipt left in many of the returned bags.

The industry that recycles the present plastic shopping bags most often shreds them and re-extrudes them into pellets to be used alone or mixed with virgin plastic material to make thick film for disposable trash bags and the like. The paper fiber created by the paper receipts is a continuing problem for the recyclers since it clogs up the screens in the extruder and causes holes to form in the film-making process.

An alternative means for printing receipts is exemplified by the systems for printing receipts at gas stations where a thermal printing process is employed. There is also a need to provide longer rolls of printable material for thermal printers to reduce costs and reduce the frequency that a roll must be changed.

The general concept of employing a thermoplastic material for the fabrication of sales receipts is disclosed in U.S. Pat. No. 5,229,218 (Dobreski). However, as far as applicant is aware, no commercially viable product has been developed using this concept. The reasons for this are that the person of skill in the art must take a significant number of additional steps beyond the teachings of the Dobreski patent in order to arrive at a commercially viable product. For example, the Dobreski patent does not provide sufficient details to select a specific thermoplastic material which is economical, of sufficient strength and which can be reliably fabricated into a printable film. Thus, the present inventors have surprisingly found that a very simple, economical combination can be used in order to provide a commercially viable sales receipt. These and other objects of the present invention will be apparent from the summary and detailed descriptions which follow.

SUMMARY OF THE INVENTION

An object of the present invention is to provide an improved printable media for sales receipts which is primarily constructed from a thermoplastic material, typically polyethylene or polypropylene, and is just as recyclable as the plastic shopping bags used at a cash register.

Another object of the present invention is to provide a printable media to be used for printing sales receipts to improve the efficiency of the check-out process and enhance the post-consumer recyclability of the plastic bags used by the stores.

Another object of the present invention is to provide a printable media suitable for use in thermal printing processes to improve the efficiency of the thermal printing process and reduce the costs of such printable media. Further objects will appear from the following.

In a first aspect, the present invention relates to a printable media for use in business machines for recording printed data. This printable media is recyclable along with recyclable shopping bags. The printable media comprises a thermoplastic material consisting essentially of polyethylene or polypropylene, an effective amount of a pigment to provide sufficient opacity to said printable media to permit printed data recorded thereon to be readable and a sufficient amount of a matting agent to improve the printability of the printable media. Preferably, the printable media has a thickness of from about 0.5 to about 3.0 mils in order to increase the amount of printable media which can be contained on a roll.

In a second aspect, the present invention relates to a process of printing a sales receipt reflecting the sale of goods to a customer. The improvement of the present process comprises the step of printing a receipt for the sales transaction on a printable recyclable media which comprises a thermoplastic material, an effective amount of a pigment to provide sufficient opacity of said media to permit the printing to be readable and a sufficient amount of a matting agent to improve the printability of the printable media. The thermoplastic material is preferably polyethylene or polypropylene, although any of the polymers identified in U.S. Pat. No. 5,229,218, the disclosure of which is herein incorporated by reference, as well as other films capable of receiving printing thereon, may be utilized. Again, preferably in this aspect of the invention the printable media has a thickness of from about 0.5 to about 3.0 mils in order to reduce the number of times that the roll of printable media must be changed during a given business cycle.

Further objects and advantages of the present invention will be apparent from the detailed description of the preferred embodiments which follows.

DETAILED DESCRIPTION OF THE PREFERRED EMBODIMENTS

The printable media of the present invention is printable by the same printers that print the current paper tapes which are used as receipts for the sale of goods. Moreover, no adjustments to the current printing equipment is required to print onto the printable media of the present invention. This goes for both the inkjet-type and ribbon printers which are used in cash registers as well as for the thermal printers which are used more typically at gasoline stations, for example.

The present invention offers many additional benefits, including among other,

1. The printable media includes a substantial portion of a thermoplastic material, preferably polyethylene or polypropylene and, as a result, will not absorb moisture to an extent sufficient to distort or destroy the printing on the surface of the printable media. Thus, the printable media of the present invention can get wet without having a significant adverse effect on the readability of the printing on the media.
2. The printable media of the present invention is from about 0.5 to about 3 mils in thickness. This represents a thickness which is only about ⅓ as thick as conventional paper cash register tapes. As a result, the same diameter roll of the printable media of the present invention yields nearly three times as much printable sales receipt tape as an equivalent sized roll of conventional paper tape. This leads to significant savings in the number of times that the sales receipt tape needs to be changed in use, in transportation costs since the printable media rolls of the present invention are of similar weight as the rolls of the prior art despite being three times as long, and to significant savings in manufacturing costs since the cycle time can be reduced in the production process.

3. The printable media of the present invention is fabricated from the same basic thermoplastic resin as plastic shopping bags and will generally contain no paper or natural fibers to taint the recycling process of these plastic shopping bags. As a result, the printable media of the present invention can be recycled along with the plastic shopping bags without having any adverse effects on the recycling process as occurs with conventional paper tapes when they are included in the recycling process.

4. The printable media of the present invention is just as recyclable as the plastic shopping bags and thus yet another aspect of the shopping process can be recycled thereby leading to less overall waste being produced.

In a preferred embodiment, the primary component of the printable media of the present invention is polyethylene, as this is the material from which shopping bags are typically manufactured. A variety of different polyethylene materials can be employed for fabricating the printable media of the present invention including high density polyethylene (HDPE), medium density polyethylene (MDPE), and linear low density polyethylene (LLDPE), among others. A preferred polyethylene material for use in fabricating the printable media of the present invention is high density polyethylene. More preferably, high molecular weight high density polyethylene is employed since the properties of this material appear to be most suitable for the application as a printable media.

The printable media of the present invention can be fabricated using conventional processes for the production of thermoplastic polymeric films. Thus, the preferred methods for fabricating the printable media of the present invention are by mixing in all of the ingredients of the printable media and then preparing either a blown film or a cast film of a sheet having a thickness of from about 0.5 to about 3.0 mils. These processes are simple, economical, and produce a consistent quality product which is sufficiently durable to be used as a cash register tape. The most preferred process for making the printable media of the invention is by preparing a blown film of a thermoplastic material, typically polyethylene or polypropylene, which has a thickness of from 0.8 to 2.0 mils.

A significant advantage of the present invention is that no additional polymer processing steps are required to fabricate a commercially useful printable media. This means that no orienting step is required in the production process and that additional, expensive coating steps can generally be avoided unless the media is designed for special applications such as thermal printing or printing two copies employing pressure sensitive encapsulated inks.

Typically, certain additives are employed in order to render the thermoplastic film suitable for use as a printable media. Thus, in order to provide sufficient opacity of the film, a pigmenting agent is typically added to the film during the film-forming process. Conventional pigments may be employed for this purpose. The most preferred pigment for use in the present invention is titanium dioxide since it provides a white color to the film which significantly improves the readability of printing on the film while at the same time the titanium dioxide does not interfere with the recycling process. Other pigments can be employed in conventional amounts if different color printable media are desired. Generally, however, pigments which do not interfere with the process of recycling the materials used to fabricate plastic shopping bags and the printable media of the present invention should be employed.

A second additive which is employed to improve the printability of the printable media of the present invention is a matting agent. It has been found that the addition of a matting agent is necessary to provide sufficient printability of the thermoplastic film of the present invention in order for it to function as a printable media which can be used as a sales receipt. An example of a suitable matting agent for use in the film of the present invention is calcium carbonate or talc. Other conventional fillers and/or matting agents may be employed to improve the printability of the printable media.

Other conventional additives may be employed in the thermoplastic film as long as they do not adversely affect the key properties of opacity, printability and the strength of the film which permits the film to be fabricated in the thicknesses given above. For example, from about 0.1 to about 5% by weight, based on the total weight of the composition of an anti-static agent can be employed in the printable media of the present invention in order to reduce the amount of static electrical charge which amasses in the printable media. More preferably, a non-amine type anti-static agent is used. This aids in storage and handling of the printable media by reducing the adverse consequences which may occur due to buildup of static electricity.

Preferred printable media of the present invention comprise from about 20 to about 80% by weight, based on the total weight of the printable media, of a thermoplastic material, typically polyethylene or polypropylene, from about 1 to about 70% by weight, based on the total weight of the printable media, of a matting agent and from about 0.1 to about 30% by weight, based on the total weight of the printable media, of a pigment. More preferably, the printable media comprises from about 49 to about 80% by weight of polyethylene or polypropylene, from about 20 to about 50% by weight of matting agent and from about 1–10% by weight of pigment.

It is generally undesirable to incorporate more than one polymeric material into the printable media of the present invention since such other materials may interfere with the recycling process. In some cases, however, it may be desirable to employ other materials to modify the properties of the printable media for specific applications, if desired. For example, where the primary component is polyethylene or polypropylene, polystyrene may be added to improve strength of the printable media.

A variety of modifications can be made to the printable media of the present invention. For example, a multi-layer printable media can be provided which includes encapsulated pressure-sensitive inks located between the two layers such that two copies of the receipt are printed simultaneously by virtue of the pressure-sensitive layer. Conventional technology for making a pressure-sensitive second layer of the printable media can be employed. Such a layer would then be applied by conventional means to a primary layer of the printable media of the present invention.

In an alternative embodiment, the present invention can be adapted for use in thermal printing processes by applying a thermal chromogenic material to one surface of the printable media of the invention using any conventional means in order to provide a thermally printable media. Such thermally printable tapes can be adapted for printing in either monochrome colors such as black or in a variety of different colors, if desired.

The ability to use the printable media of the present invention as a replacement for paper and to reduce the thickness of the printable media by as much as 2/3 provides a significant improved efficiency to users because they only have to spend 1/3 as much time replacing cash register tapes, they require only 1/3 of the storage space, spend 1/3 on the cost of freight and in addition, substantial savings are achieved during the manufacturing process since the number of operations per foot of material is decreased relative to the production of conventional paper cash register tapes.

In addition to the non-wetting properties of the printable media, the present invention makes a tremendous contribution to the recyclability of the plastic bags that sales receipts are most often found in. The industry that recycles these plastic shopping bags most often shred them and re-extrude them into pellets to be used alone or mixed with virgin material to make the thick film used for disposable trash bags. The paper fiber which is attributable to paper receipts found in these plastic shopping bags is a continuing problem for the recyclers. The reason for this is that the paper fiber clogs up the screens in the extruder and causes holes to form in the subsequent film-forming process.

The printable thermoplastic material media of the present invention eliminates the paper fiber contamination problem for the recycler. Further, since the present printable media can be fabricated from the same basic resin as the plastic shopping bags, the printable media of the present invention blends well with the shopping bags in the recycling process thereby producing clean, homogeneous resin pellets with no contamination. Finally, because of the relatively small thickness of the present printable media and its relatively small concentration relative to the amount of plastic bag material in the recycling process, the components of the printable media have virtually no impact on the melt index of the re-extruded bag resin. This new printable tape is recyclable, produces high yields, is non-wetting and is very resource efficient.

The foregoing description of the invention has been provided for the purpose of illustration and description only and is not to be construed as limiting the invention in any way. The scope of the invention is to be determined from the claims appended hereto.

I claim:

1. A printable media for use in business machines for recording printed data and which printable media is recyclable along with recyclable shopping bags, said printable media comprises a thermoplastic material consisting essentially of polyethylene or polypropylene, an effective amount of a pigment to provide sufficient opacity of said printable media to permit printed data recorded thereon to be readable and a sufficient amount of a matting agent to improve the printability of said printable media wherein said printable media has a thickness of from about 0.5 to about 3.0 mils.

2. The printable media of claim 1 wherein said printable media has a thickness of from about 0.8 to about 2.0 mils.

3. The printable media of claim 1 wherein said pigment comprises titanium dioxide and said matting agent comprises calcium carbonate.

4. The printable media of claim 4 wherein said printable media further includes polystyrene for providing additional strength.

5. The printable media of claim 4 wherein said printable media comprises from about 20 to about 80% by weight, based on the total weight of the printable media, of said polyethylene or polypropylene, from about 1 to about 70% by weight, based on the total weight of the printable media, of said matting agent, and from about 0.1 to about 30% by weight, based on the total weight of the printable media, of said pigment.

6. The printable media of claim 5 wherein said printable media is fabricated by blowing or casting a polyethylene or polypropylene-based film.

7. The printable media of claim 2 further comprising a thermal chromic layer located on the printable media to permit thermal printing on the printable media.

8. The printable media of claim 2 further comprising a second, printable layer and a layer of encapsulated pressure sensitive ink such that printing with application of pressure on said polyethylene or polypropylene causes a second copy of said printing to be made on the second printable layer.

9. The printable media of claim 6 further comprising an effective amount of an antistatic agent to reduce the amount of static electricity occurring in the printable media.

10. A recyclable printable media having a thickness of from about 0.5 to about 3.0 mils for use in business machines for recording printed data and which is recyclable along with recyclable shopping bags, the printable media comprising a thermoplastic material in the absence of naturally occurring fibrous material, an effective amount of a pigment to provide sufficient opacity of said printable media to permit printed data recorded thereon to be readable and a sufficient amount of a matting agent to improve the printability of said printable media.

11. The printable media of claim 10 wherein said printable media has a thickness of from about 0.8 to about 2.0 mils.

12. The printable media of claim 11 wherein said pigment comprises titanium dioxide and said matting agent comprises calcium carbonate.

13. The printable media of claim 12 wherein said thermoplastic material is selected from the group consisting of polyethylene, polypropylene, polystyrene and mixtures thereof.

14. The printable media of claim 13 wherein said printable media comprises from about 20 to about 80% by weight, based on the total weight of the printable media, of said thermoplastic material, from about 1 to about 70% by weight, based on the total weight of the printable media, of said matting agent, and from about 0.1 to about 30% by weight, based on the total weight of the printable media, of said pigment.

15. The printable media of claim 14 wherein said printable media is fabricated by blowing or casting said thermoplastic material.

16. The printable media of claim 15 further comprising an effective amount of an antistatic agent to reduce the amount of static electricity occurring in the printable media.

17. The printable media of claim 10 further comprising a thermal chromic layer located on the printable media to permit thermal printing on the printable media.

18. The printable media of claim 10 further comprising a second, printable layer and a layer of encapsulated pressure sensitive ink such that printing with application of pressure on said thermoplastic material causes a second copy of said printing to be made on the second printable layer.

19. In a process of printing a checkout receipt reflecting the sale of goods to a customer, the improvement comprising:

printing a receipt for said sales transaction on a printable, recyclable media which comprises a thermoplastic material consisting essentially of polyethylene or polypropylene, an effective amount of a pigment to provide sufficient opacity of said media to permit the printing to be readable and a sufficient amount of a matting agent to improve the printability of said printable media.

20. The process of claim 19 wherein said printable media has a thickness of from about 0.5 to about 3.0 mils.

21. The process of claim 20 further comprising recycling the receipt together with one or more shopping bags by shredding the receipt and one or more bags and extruding the shredded material to form pellets.

22. The process of claim 21 further comprising films from said pellets, which films can be fabricated into other commercial products.

* * * * *